July 3, 1962 H. C. KENDALL ET AL 3,042,899
ULTRASONIC VEHICLE DETECTION SYSTEM
Filed June 16, 1959 5 Sheets-Sheet 1
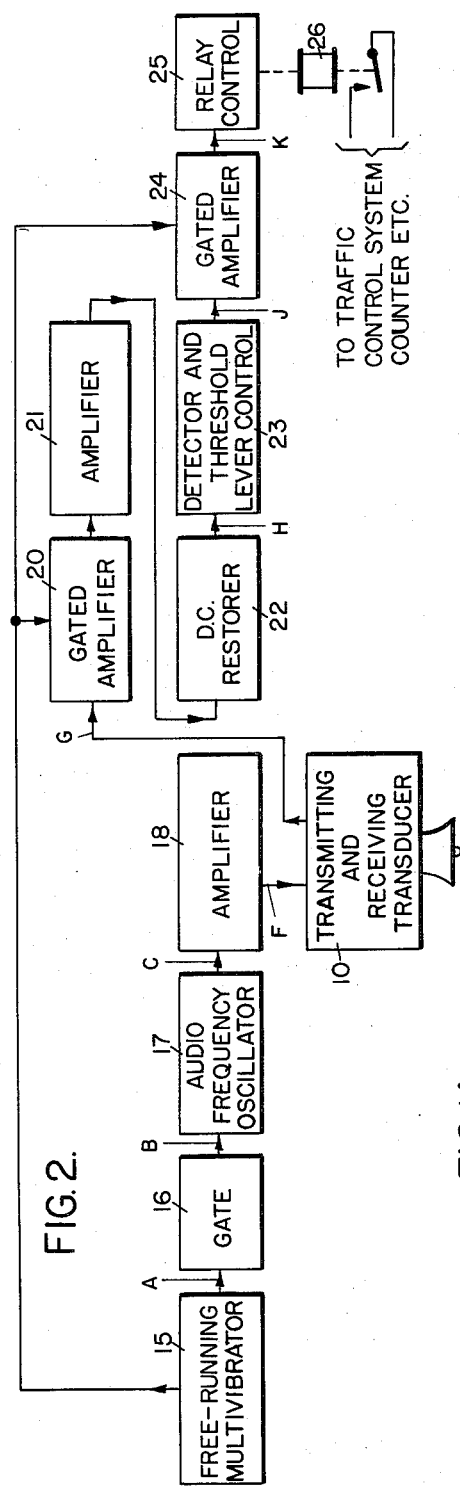
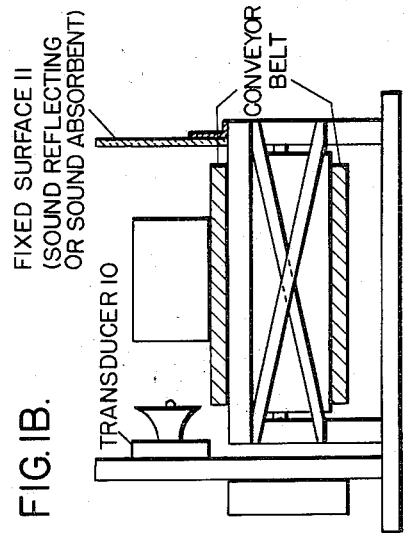
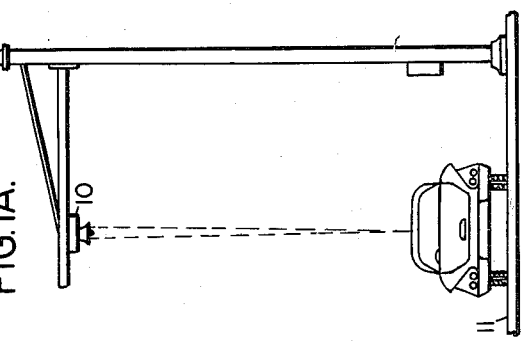
*INVENTORS*
H.C. KENDALL, J.H. AUER JR.
N.A. BOLTON AND K.H. FRIELINGHAUS
BY
THEIR ATTORNEY

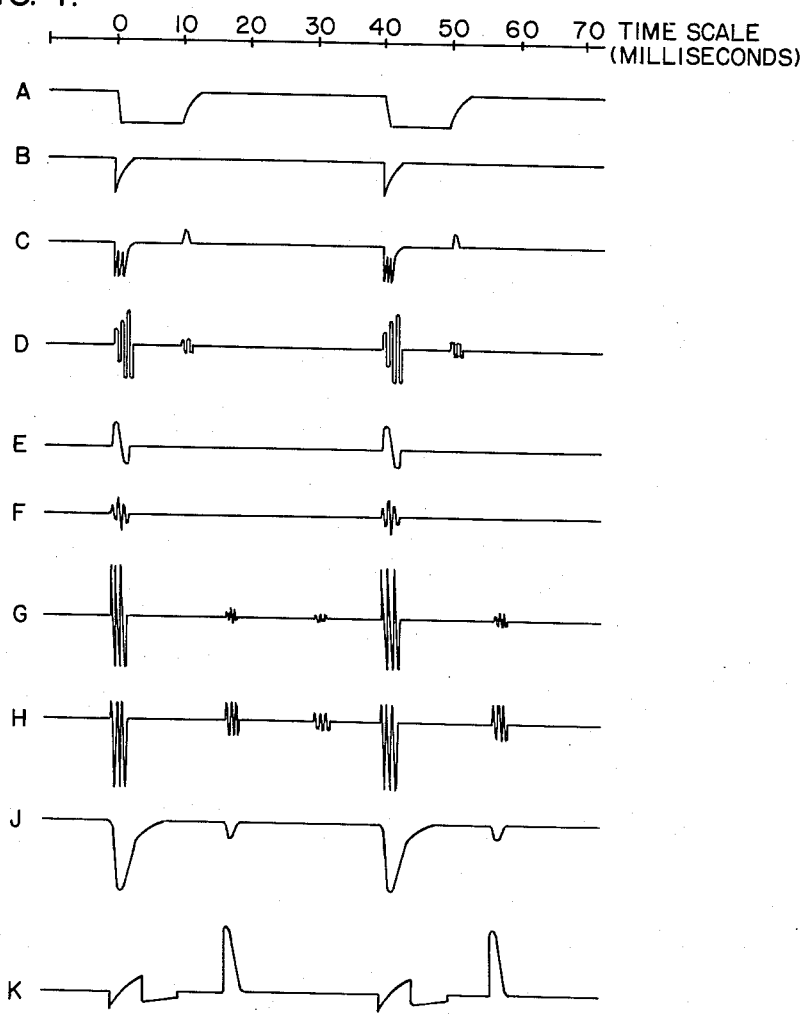

July 3, 1962  H. C. KENDALL ET AL  3,042,899
ULTRANSONIC VEHICLE DETECTION SYSTEM
Filed June 16, 1959  5 Sheets-Sheet 5
FIG. 5.
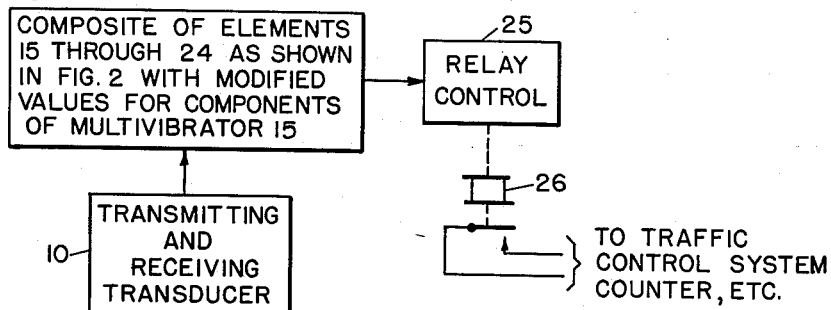
FIG. 6A. NO OBJECT
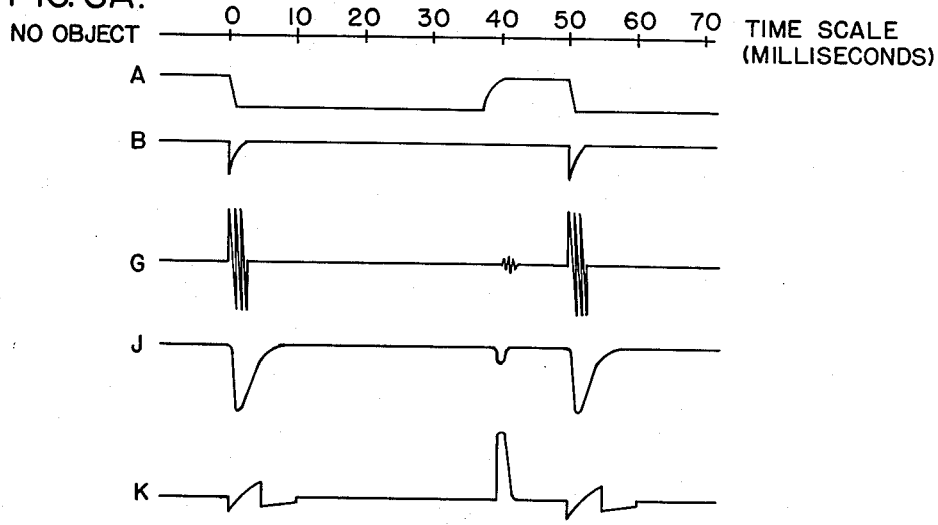
FIG. 6B. OBJECT PRESENT
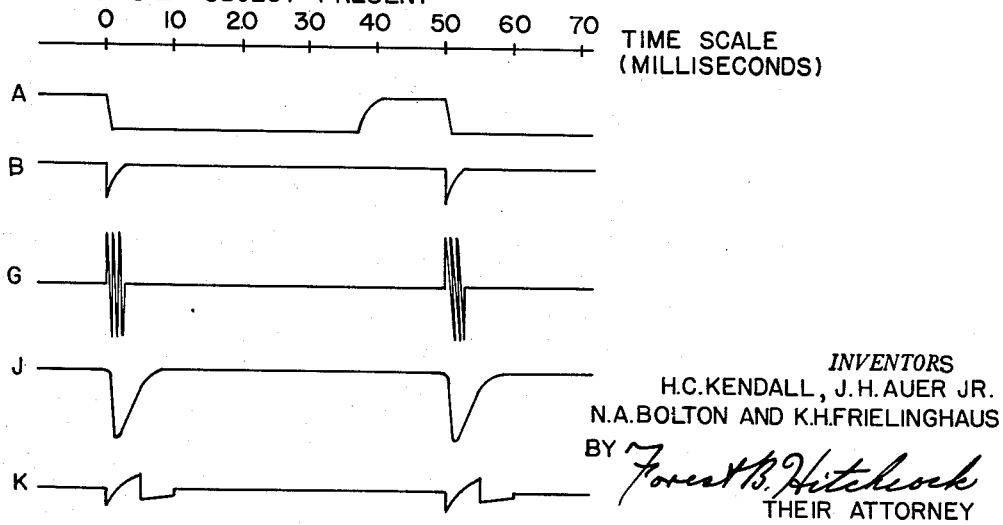
INVENTORS
H.C. KENDALL, J.H. AUER JR.
N.A. BOLTON AND K.H. FRIELINGHAUS
BY Forest B. Hitchcock
THEIR ATTORNEY 3,042,899
ULTRASONIC VEHICLE DETECTION SYSTEM
Hugh C. Kendall and John H. Auer, Jr., Rochester, Norman A. Bolton, Scottsville, and Klaus H. Frielinghaus, Rochester, N.Y., assignors to General Railway Signal Company, Rochester, N.Y.
Filed June 16, 1959, Ser. No. 820,691
16 Claims. (Cl. 340—38)

This invention relates to the detection of objects by ultrasonic means, and more particularly pertains to a system for the detection of vehicles by a system employing pulsed ultrasonic energy.

We have disclosed in our previously filed application, Ser. No. 808,736, filed April 24, 1959, a system for the detection of vehicles wherein the detecting means repetitively transmits short pulses of ultrasonic energy towards vehicles which pass between the detecting apparatus and a fixed reflecting surface which may be the roadway upon which the vehicles travel. The detecting apparatus is responsive to reflections of this ultrasonic energy from both the vehicles and alternatively from the fixed reflecting surface, and gating circuits and other means are employed to provide a high degree of differentiation between ordinary passenger vehicles, trucks, pedestrians, and other objects. This system of our prior application therefore particularly lends itself to those applications where an accurate count of vehicles may be required as in a traffic control system or in a system of parking control for a ramp-type parking garage.

Although this system of our aforesaid prior art application, Ser. No. 808,736, is neither especially complex nor expensive in view of its many outstanding advantages over the known prior art systems of vehicle detection, we have nevertheless found that it would be highly desirable to provide a system for the detection of vehicles or other objects which would be yet more compact and of lower cost to construct and which, although not possessing the unusual and novel characteristics of discrimination between different kinds of objects exhibited by the system of our prior application, would nevertheless fulfill all of the requirements of a system which could be used, for example, to detect the presence of a succession of vehicles rather than to count them individually.

Such a system has great utility in a traffic light control system, for example, where the system can provide one distinctive kind of output as long as vehicles are successively detected as passing a detecting means, but where a different distinctive output is provided when no vehicle has been detected during some predetermined interval. Thus, it can readily be seen that this system will have particular utility in such a traffic light control system by tending to maintain a green aspect of the traffic signal as long as vehicles are detected as passing the vehicle detecting means of this invention in advance of a signal, but where the traffic signal is allowed to display a red aspect and permit traffic to proceed in the other direction if it is determined by the vehicle detecting means of this invention that there is no vehicle in approach of the traffic signal. Other fields of utility of this invention will be readily apparent, and it will be apparent also that the invention may also be used for the counting of vehicles even though it may not provide the high degree of discrimination exhibited by the invention of our prior application, Ser. No. 808,736.

In its broader aspects, the present invention contemplates the general concept of transmitting short pulses of sound energy toward the vehicles to be detected. These pulses may be of an ultrasonic frequency so that they will not be audible to humans, but it is also within the scope of this invention to have the pulses of sound energy within the audible spectrum. Electronic means are employed to generate these pulses of sound energy, and the conversion of the electrical energy to sound energy is effected by the usual transducing means which is well-known in the art. Similar transducing means receives the reflected sound pulses, and these are again in turn converted to electrical energy. According to the illustrated embodiment of the invention disclosed herein the same transducing means is used for the transmission of the sound pulses and their reception but it should be understood that this is merely an expedient and that the invention can equally well be practiced by using separate transmitting and receiving transducers.

Preferably, the transmitting and receiving transducer means are so positioned and directed that, in the absence of any vehicle or object to be detected, the sound pulses emanating from the transmitting transducer means are transmitted toward a fixed reflecting surface and then reflected back to the receiving transducer means. More specifically, for the particular field of utility of this invention disclosed herein, i.e. for the detection of highway traffic, it is contemplated that the transducer means will be positioned above the lane of traffic and directed downwardly in such a manner that transmitted pulses, in the absence of any vehicles, are reflected from the roadway back to the receiving transducer means. In the presence of a vehicle or object, this normal reflection from the roadway is interrupted and the sound pulses are then instead reflected from the vehicle top back to the receiving transducer means 41. Where it is intended that objects other than highway vehicles be detected, the arrangement may be modified accordingly. For example, when the system of this invention is used to detect the presence of objects on a conveyor belt it would ordinarily be desirable to provide a fixed reflecting surface on the side of the conveyor belt opposite the detection means of this invention. The beam of ultrasonic pulses would then be directed in such a manner that, in the absence of any object on the conveyor belt, the beam would be directed toward the fixed reflecting surface and then back to the receiver transducing means. In the presence of an object on the conveyor belt, this normal path for the sound energy would be interrupted and the sound pulses would then be reflected from the object back to the receiving transducer means. For an application of this sort a sound absorbing rather than a sound reflecting surface may be provided behind the conveyor belt as will be more fully described later.

Described briefly, the detection means of this invention comprises electronic timing means whose frequency of operation may be suitably adjusted according to the desired repetition rate of the transmitted pulses. Once for each cycle of this oscillator means, an electronic gate is rendered effective, and this gate acts upon an oscillator which is tuned to provide the desired ultrasonic sound frequency. The gating circuit causes the audio oscillator to operate for only a brief interval in accordance with the desired pulse length of ultrasonic energy. The resulting short, repetitive ultrasonic pulses are subsequently amplified and applied to the transmitting transducing means.

The receiving transducer means responds to any received sound energy and converts it into corresponding electrical energy. This received signal is filtered so as to discriminate against received sounds which are not of the frequency of the transmitted sound pulse and is then applied to an amplifying means. This amplifying means is also gated, however, by the electronic oscillator which establishes the repetition rate of the transmitted sound pulse.

The gating circuits are so organized that the receiver is rendered substantially non-responsive to any input energy it receives for a period of time which encompasses that in which the outgoing sound pulse is transmitted. One function of this gating is to render the receiver inactive with respect to the transmitted sound pulse. This is particularly important when the same transducer is used both for transmitting and receiving since the transmitted pulse is many times larger than even the largest reflected pulse ordinarily received; therefore, this gating means has the effect of suppressing the transmitted pulse in the receiver so that the transmitted pulse is not recognized as a legitimate reflected signal.

In addition to this, however, the repetition rate established by the electronic oscillator is so selected with respect to the total propagation time of a sound wave from the transmitting transducer to the fixed reflecting surface and back to the receiving transducer that each such reflected pulse, related to a particular transmitted pulse, is received again at the receiving transducer at the same time that the next transmitted pulse is sent out. In other words, the pulse reflected from the fixed reflecting surface in response to one transmitted pulse is received at the receiving transducer at the very same time that the next pulse is being transmitted. It will be apparent that this condition is brought about by selecting the cycle time of the electronic timing means which controls the pulse repetition rate to be the same as the pulse propagation time from the transmitting transducer to the fixed reflecting surface and back again to the receiving transducer.

The fixed reflecting surface precludes the possibility of receiving reflected sound waves from more distant reflecting surfaces, and the sound energy reflected from the fixed reflecting surface is effectively masked in the manner generally described above. It follows, therefore, that any sound pulses received by the receiving transducer following the transmission of one pulse and before the transmission of the next must represent sound energy reflected from a vehicle or object which is interposed between the transducing means and the fixed reflecting surface.

It follows from this description that these techniques may also be used to advantage where a fixed reflecting surface is not purposely employed but wherever a troublesome, spurious background reflection occurs, the most obvious example being the reflections obtained from the pavement in a vehicle detection system. Broadly then, such an undesired reflection may be rendered ineffective by so selecting the pulse repetition rate that each transmitted pulse occurs concurrently with the reception of such spurious reflection from the next preceding pulse.

In a first embodiment of this invention, the output of the receiver controls a relay, and this relay is preferably controlled to be picked up only for each vehicle intercepting the beam of sound energy. Alternatively, the relay may be controlled to be in an energized condition whenever reflected pulses are received at a sufficiently close rate to indicate that vehicles or objects are successively intercepting the beam of sound energy. If no reflected pulses from a vehicle or object are received for a period in excess of some predetermined interval, the relay will drop away.

An alternative embodiment of the invention is also disclosed wherein the receiving circuits are again rendered nonresponsive at the time of transmission of each sound pulse but the pulse repetition rate is sufficiently slow so hat a following sound pulse is not transmitted until sufficient time has elapsed to permit reception of the reflection of the last-transmitted pulse from the fixed reflection surface in the background. In this embodiment, the receiving means becomes ineffective at the time of transmission of a pulse and remains nonresponsive throughout the time within which reflections might be expected from a vehicle passing in front of the fixed background surface, but this condition terminates prior to the time of the expected reception of a reflection from the fixed background surface. Therefore, when no vehicle is present, the receiving means continually provides an output signal for each received reflection pulse received from the background surface, but when a vehicle intercepts the beam so that reflections cannot be received from the fixed background surface, then the receiving means cannot produce any output signal since, as mentioned, it cannot respond to reflection pulses obtained from the vehicle. This lack of any output signal from the receiving means effects registration of the vehicle's presence.

It is thus an object of this invention to provide a system for the detection of vehicles or objects which, although embodying a number of novel principles, is nevertheless relatively inexpensive to manufacture and yet highly reliable in operation.

It is another object of this invention to provide a system for the detection of vehicles or other objects wherein a fixed, extraneous reflection obtained from a fixed reflecting surface behind the vehicle or object to be detected is effectively ignored as well as other vehicles and objects which are behind the fixed reflecting surface.

Another object of this invention is to provide means for the detection of vehicles wich can readily discriminate between vehicles and pedestrians.

It is still another object of this invention to provide a means for detection of vehicles or other objects which utilizes a single transducer for both transmitting and receiving purposes and which employs a novel gating means so that the receiver is non-responsive to the transmitted pulses.

Other objects, purposes, and characteristic features of this invention will be obvious from the accompanying drawings and in part pointed out as the description of the invention progresses.

In describing this invention in detail, reference will be made to the accompanying drawings illustrating one embodiment of this inventon wherein:

FIGS. 1A and 1B illustrate two possible fields of utility of the invention and illustrate the positioning of the apparatus;

FIG. 2 is a block diagram illustrating the circuit organization of the system of this invention;

FIG. 4 illustrates a plurality of wave-forms of voltages appearing at various selected points in the circuit illustrated in FIGS. 3A and 3B; and FIGS. 5, 6A and 6B illustrate a modified form of the invention.

Figure 3A:
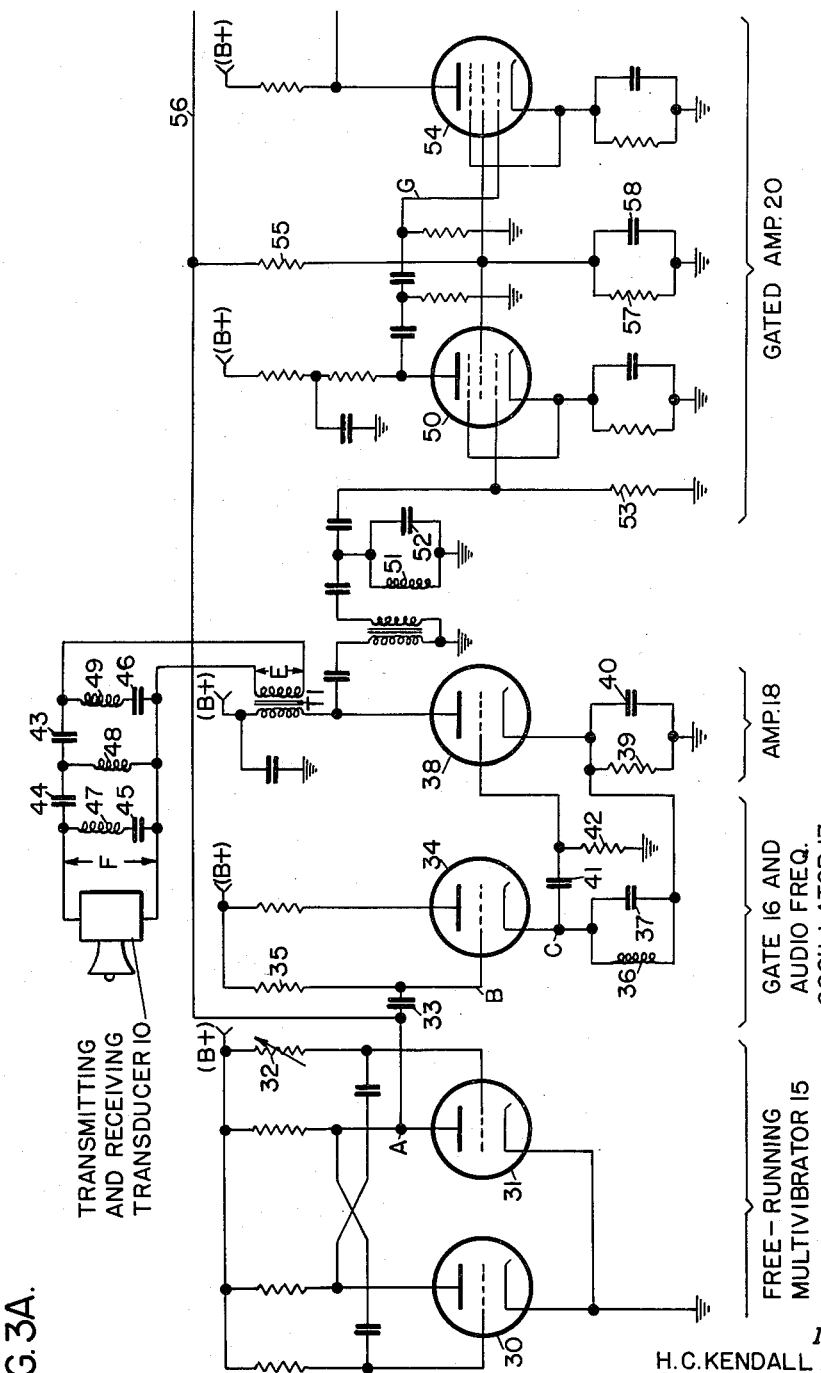
FIGS. 3A and 3B are a circuit diagram of the present invention.

FIG. 1A illustrates diagrammatically one manner in which the system of this invention may be used for the detection of vehicles. Alongside the lane of traffic in which vehicles are to be detected there is a pole which provides a means of support for the single transducer which may be used. As shown, the transducer is so directed that the transmitted beam of audio pulses is aimed directly downward so as to impinge upon the top of each passing vehicle. When no such vehicle is present as is shown in FIG. 1, the transmitted pulses then impinge upon the roadway. In either case, pulses are reflected from the vehicle top or roadway, respectively, upward again to the transducer 10. Preferably the transducer is so oriented as to direct its beam of transmitted energy vertically downward toward the roadway as it has been found that this tends to maximize the amplitude of the reflected signal. However, it will be appreciated that this invention is in no way limited to the orientation of the transducer in this particular manner but that it may equally well be directed at some angle toward approaching or receding traffic or may be directed alternatively at some angle across the roadway, this latter method being particularly applicable when a transducer positioned alongside a roadway is to be employed for detecting the presence of vehicles in a far lane of traffic.

FIG. 1B illustrates an application of this invention to the detection of objects moving along a conveyor belt. Here the transducer 10 is positioned at or about the height of the objects to be detected and it is so orientated that the beam of transmitted sound pulses is directed more or less horizontally across the path of such objects. A fixed surface is then preferably positioned on the other side of the conveyor belt, and this surface may be formed of either a sound reflecting or a sound absorbent material. In either event, this fixed surface will provide the function of prohibiting the travel of the sound pulses to areas behind the conveyor belt from whence random reflections may occur and be directed toward the transducer 10 so as to provide spurious effects. Where this fixed surface is of sound absorbing material, reflections will only occur from the objects to be detected. On the other hand, if this surface is of a sound reflecting nature, the spurious reflections will effectively be gated out in the manner generally described above. The organization of FIG. 1B can also, of course, be used in the detection of vehicles on the highway, particularly where a portable unit is to be employed for obtaining a traffic count and it is impractical to mount the transducer overhead in the manner shown in FIG. 1A. In this event, the fixed surface 11 may be positioned in place in the roadway as between adjacent lanes of traffic and such fixed surface will then have the function of eliminating sound reflections from vehicles passing in such adjoining lanes.

As shown in FIG. 2, a free-running multivibrator 15 is provided, and this establishes the repetition rate of the transmitted sound pulses. The output voltage of the multivibrator 15 controls a gate 16 which, in turn, controls the operation of an audio frequency oscillator 17. Normally the gate 16 is closed, thereby preventing the audio frequency oscillator 17 from oscillating. However, once for each cycle of the free-running multivibrator 15, the gate 16 is opened for a brief interval and when this occurs the audio frequency oscillator is caused to operate at its predetermined frequency. The gate 16 remains open for only a very brief interval, however, so that the audio frequency oscillator is very quickly restored to its normal non-operating condition. Each pulse of audio frequency energy so generated is applied to the amplified 18 whose amplified output is then applied to the transmitting and receiving transducer 10. Consequently, repeated pulses of audio frequency energy are directed by this transducer toward the objects to be detected.

Each transmitted pulse is reflected either from the fixed surface 11 or roadway or from the object desired to be detected. The reflected pulses act upon the transducer 10 and cause it to provide corresponding electrical pulses which are applied to a gated amplifier 20. This gated amplifier 20 is ordinarily responsive to received input energy, but it is so gated by the multivibrator 15 that it becomes substantially insensitive to input energy during a time interval which encompasses that in which the audio frequency oscillator 17 is conditioned to provide its audio output pulses. In this way, the energization of the transducer 10 at the desired time of pulse transmission finds the gated amplifier 20 in its gated "off" condition. Also, as previously pointed out, each reflected pulse resulting from the reflection of a pulse from the fixed reflecting surface 11 or roadway is received by the transducer 10 at the time of transmission of the next occurring pulse so that it too is received at a time when the gated amplifier 20 is in its gated "off" position.

The output of the gated amplifier 20 is applied to another amplifier 21 which further amplifies the received reflected signals. The output of this amplifier 21 is applied to a D.C. restorer 22 whose output then is applied to a detector, and threshold level control 23. As will subsequently be described in detail, this circuit provides a means for causing the output to be responsive only to reflected signals whose amplitude is above some predetermined value. This provides for a ready means of distinguishing between those reflected signals which are received from vehicles and those which are received from people. The output of this control circuit 23 is then applied to another gated amplifier which is likewise gated by the output voltage of the multivibrator 15. The gating effect here again tends to minimize those signals acting on the transducer 10 during the time of pulse transmission. The output of this amplifier 24 then is applied as an input signal to the relay control 25 which controls the energization of the associated relay 26.

The relay control may be so organized that the intermittent reception of reflected pulses from vehicles or objects to be detected will cause relay 26 to remain picked up as long as such pulses are received with a frequency above some predetermined minimum. The failure to receive such a reflected pulse during a predetermined interval permits the relay 26 to drop away. The condition of this relay is then indicative of whether or not there is traffic of some particular density intercepting the path of the sound energy transmitted by transducer 10. Alternatively, the relay control 25 may cause the relay 26 to pick up for each individual vehicle or object detected, and when used in this manner, the contacts of the relay may be effective to control counting apparatus so that the number of vehicles passing along the roadway may be ascertained.

Reference to the detailed circuit diagram of FIG. 3 illustrates that the free running multivibrator 15 comprises the two triode tubes 30 and 31. This multivibrator is of the conventional type and it will thus suffice to say that the two tubes 30 and 31 alternate respectively between conductive and non-conductive conditions. Thus, one tube when conductive tends to hold the other tube in a non-conductive state and vice versa. The length of time during which one of these tubes, when once controlled to a non-conductive state, remains in that state is determined primarily by the time constant for the discharging of the capacitor which connects the grid of that tube to the plate of the opposite tube. A control is provided by means of the variable resistor 32 connecting the grid of tube 31 to the (B+) terminal for selecting the time interval throughout which tube 31 remains non-conductive on each cycle. Variation of the amount of resistance provided by this variable resistor thus not only varies the cut-off time of tube 31 for each cycle but also has the effect of controlling the cycle repetition rate of the multivibrator 15 as a whole. In other words, resistor 32 may be varied in its value so as to select the frequency of operation of this multivibrator 15.

The waveform or voltage which thus results at the plate of tube 31 is as shown at line A of FIG. 4. When tube 31 is non-conductive, its plate voltage is at a relatively high value, but periodically, once for each cycle of operation of the multivibrator, its plate voltage is abruptly reduced in value when tube 31 becomes conductive. After tube 31 has been conductive for a predetermined interval, the relative conductive states of the two tubes 30 and 31 is reversed so that tube 31 is then restored to its non-conductive state and its voltage then rises to the higher value as shown at line A. This latter condition is maintained then throughout the remainder of the cycle of operation when the previously described chain of events again occurs.

The voltage at the plate of tube 31 is applied through a capacitor 33 to the control grid of tube 34. Capacitor 33 and resistor 35 comprise the usual resistance-capacitance differentiating network. Thus, each abrupt negative-going voltage excursion at the plate of tube 31 produces a corresponding negative-going voltage spike at the grid of the tube 34, which grid is normally at approximately ground potential. Because of the very short time constant for the discharging of capacitor 33, the voltage at the grid of tube 34 remains at its low value for only a very brief interval, rising exponentially at a relatively rapid rate towards its normal ground level. From the time scale shown in FIG. 4 it is apparent, however, that the normally conductive tube 34 becomes non-conductive for an interval of approximately two milliseconds.

In the cathode circuit of tube 34 is a tuned circuit comprising the inductor 36 and parallel capacitor 37. The lower terminals of these circuit elements are both connected to the cathode of the following triode amplifier tube 38 so that the parallel elements of resistor 39 and capacitor 40 are common to both the cathode circuits of the tubes 34 and 38. Because of this, the plate-cathode current of the normally conductive tube 34 passes through the resistor 39 and provides a cathode bias for tube 38 which maintains this tube in a normally cut-off condition.

Each time that tube 34 is momentarily cut off for a brief interval in the manner described above, the energy stored in its tuned cathode circuit causes this tuned circuit to ring at a frequency determined by the component values of the inductor 36 and capacitor 37. As has been mentioned previously, the selected frequency of this audio oscillator may be in the ultrasonic range and in one particular embodiment of this invention was selected to be approximately 20 kilocycles. As soon as the grid voltage of tube 34 has been restored to a level that permits thus tube to conduct again, the resultant circuit loading provided by the conducting tube 34 causes the remainder of the energy in the tuned circuit to be dissipated. Therefore, there appears at the cathode of tube 34 a burst of energy at a selected frequency comprising perhaps 30 to 40 cycles of 20 kilocycle energy with one such burst occurring for each cycle of operation of the multivibrator 15. This is shown in FIG. 4 at line C which shows the higher frequency variations as being superimposed upon the negative going voltage dip which of course appears at the cathode of tube 34 when the normal positive cathode voltage is decreased by reason of the negative spike of voltage at the grid. It should be noted in line C also that there is a secondary effect produced at about 10 milliseconds on the time scale which results from a further excitation of the tuned cathode circuit at the time that tube 31 in multivibrator 15 is restored to its non-conductive state. Thus, the positive-going voltage rise which then results at the plate of tube 31 as shown at line A produces a momentary increase in conduction of tube 34 which excites the tuned circuit to produce this secondary effect. The gating circuits to be presently described are effective in removing this unwanted effect as will subsequently be made clear.

The resistance-capacitance coupling circuit which includes the capacitor 41 and resistor 42 supplies the audio pulses to the control grid of tube 38 from the cathode of tube 34. The time constant of this coupling network is so selected that it tends to limit substantially the low frequency components of the oscillatory voltage so that substantially only the 20 kilocycle waveform tends to appear at the control grid of tube 38. The connection of the lower terminals of the tuned circuit to the cathode circuit of tube 38 causes the ringing voltage output at this tuned circuit to appear also across resistor 39 and the parallel capacitor 40. The capacitor 40 is so chosen however that it provides a relatively low impedance to the 20 kilocycle energy so that it is in effect by-passed to ground. The result is that the cathode voltage of tube 38 corresponds essentially to the cathode bias potential of tube 34, and the decrease of this voltage at the time of the oscillations serves to gate the normally cut-off tube 38 to the "on" condition. As shown at line E of FIG. 4, considerable low frequency components are caused to appear across the secondary winding of transformer T1 whose primary winding is in series with the plate of this tube. These low frequency components are produced primarily as a result of the switching on and off of tube 38 at the pulse repetition frequency determined by multivibrator 15.

It will be observed from line E of FIG. 4 that the secondary oscillation of the tuned circuit at 10 milliseconds does not appear across the secondary winding of transformer T1. The reason for this is that tube 34 has by this time been restored to its normal conductive condition so that the normal cathode bias voltage is developed across resistor 39. This cathode bias voltage maintains tube 38 in a cut-off condition so that it can become conductive only in response to oscillations at its grid which are of substantial amplitude. The secondary oscillations occurring at 10 milliseconds are not of sufficient amplitude with the result that they do not affect the plate current of this tube.

Interposed between the secondary winding terminals of transformer T1 and the transducer 10 is a high-pass filter comprising the various circuit elements such as the capacitors 43–46 and inductors 47–49. This high-pass filter has the effect of removing substantially all of the low frequency components appearing in the transformer secondary voltage so that the energy applied to transducer 10 comprises only the 20 kc. frequency.

Reflections which are picked up by the transducer 10 travel in the reverse direction through the high-pass filter and result in a corresponding induced voltage appearing across the primary winding of transformer T1 in the plate circuit of tube 38. At the time that these desired reflections are received, tube 38 is cut off so that the operation of the transmitter does not tend to interfere substantially with that of the receiver except for certain effects which will presently be described. The plate of tube 38 is connected to the grid of the gated amplifier tube 50 through a tuned coupling circuit which comprises the parallel resonant circuit of inductor 51 and capacitor 52. This entire coupling circuit is so organized as to maximize the effect at the grid of tube 50 of the reflections which are of the known 20 kc. frequency while at the same time tending to reject insofar as possible all other extraneous signals. In this connection, the high-pass filter interposed in the circuit between the plate of tube 38 and transducer 10 is also effective in differentiating between the desired reflection signal and other signals occurring at various other frequencies.

There thus appears at the grid of tube 50, across the grid leak resistor 53, a voltage comprising the received reflection signals. There also appears here, however, certain other spurious signals whose amplitude is ordinarily many times that of the desired reflection signal. This comes about partly because of the fact that the transmitted pulse is of very large amplitude and produces a series of damped oscillations as a result of the transfer of the original pulse energy back and forth among the various transformers, tuned circuits, and filter components by reason of the imperfect matching and damping of such components. Although these various spurious oscillations are greatly reduced in amplitude with respect to the amplitude of the pulse that is actually transmitted, they are nevertheless still of considerable amplitude as compared with the received reflections which may be of very small amplitude, in the order of a few millivolts. In order that these spurious signals may be rendered ineffective, various additional gating expedients are employed throughout the receiver as will presently be described.

It will be noted that the two amplifier stages comprising the respective tubes 50 and 54 are similar in their organization. Both employ pentode type tubes whose screen grids are both gated by their being connected through a resistor 55 to wire 56 which is connected to the plate of tube 31 in the multi-vibrator 15. The screen grids are also connected through a resistor 57 and parallel capacitor 58 to ground so as to lessen the abruptness of the voltage change at the screen grids of these tubes as the multivibrator 15 switches back and forth between its opposite conditions, as this would otherwise tend to introduce additional unwanted transients in the plate currents of these tubes 50 and 54. It will be noted from examining line A of FIG. 4 that the gating voltage thus applied to the screen grids of these tubes is at a low value during the time of the transmitted supersonic pulse and that it remains low for some time following during which the spurious voltages described above are rapidly decaying in value. Because of this, these two amplifier stages are relatively ineffective at this time for amplifying these unwanted voltages so that the amplitude of these undesired signals in relation to that of the desired reflections signals is greatly reduced at the plate of the tube 54. Nevertheless, it will be observed at line G of FIG. 4 that the spurious signal is still of considerably greater amplitude than that of the received signal and even at the plate of tube 54 the unwanted signal is of greater amplitude than that of the wanted signal. The waveform at line G also illustrates that there is a secondary reflection present at about time 30, but this secondary reflection is also subsequently rejected as will later be made clear.

Figure 3B:
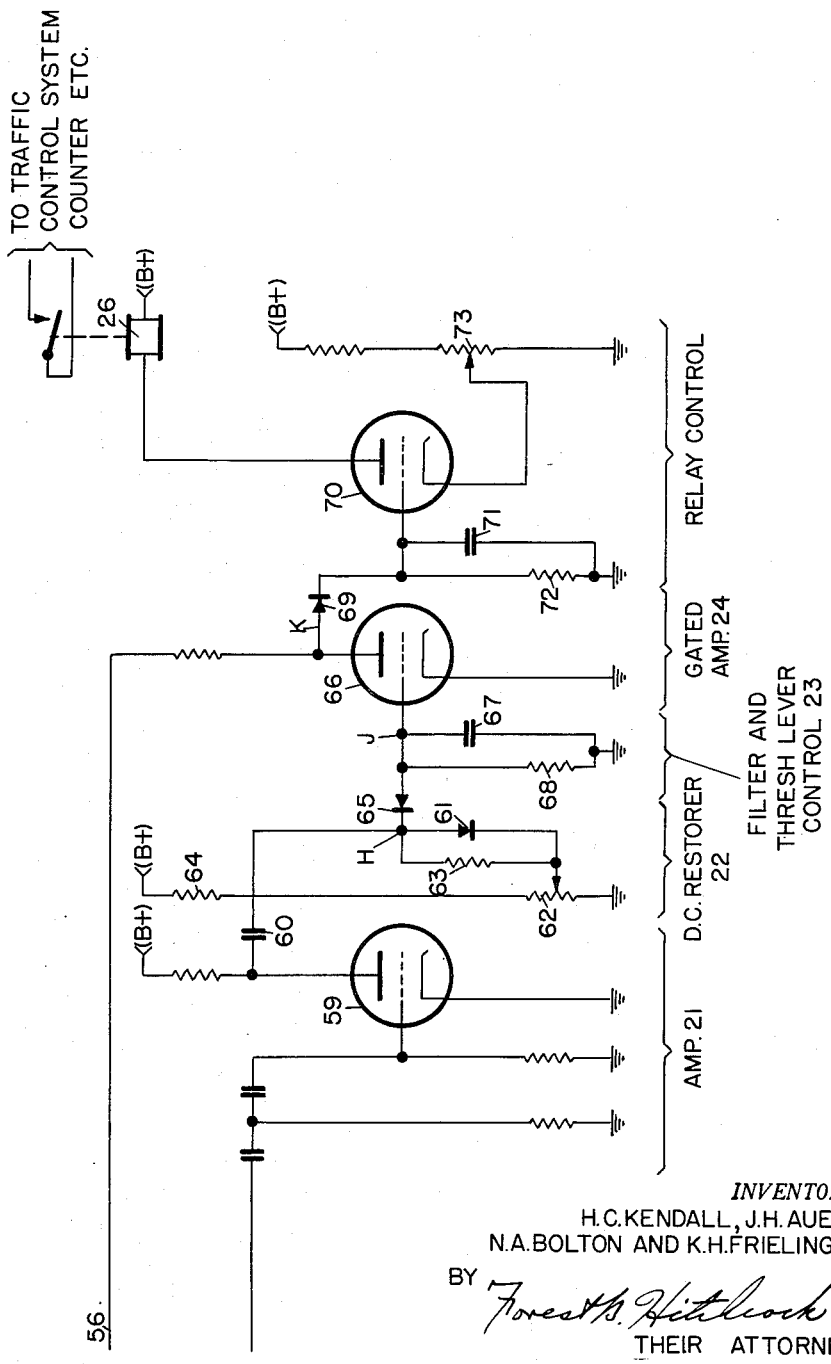

With respect to the amplifier stages comprising tubes 50 and 54, it will be noted from FIGS. 3A and 3B that cathode bias is employed for both tubes and that high pass resistance-capacitance coupling networks couple the plate voltage of tube 50 to the grid of tube 54 and likewise couple the plate voltage of tube 54 to the control grid of the triode tube 59.

The plate output voltage of tube 59 is coupled through the capacitor 60 to a D.C. restoring circuit 22 which comprises the diode 61 by means of which the point H is connected to a tap on the potentiometer 62. A resistor 63 is in parallel with the diode 61, and the resistor 64 is connected in series with potentiometer 62 between the (B+) terminal and ground. The point H is also coupled through the blocking diode 65 to the control grid of tube 66. The grid of this latter tube is connected through the filtering capacitor 67 and parallel resistor 68 to ground. The D.C. restorer is of a generally conventional type in that it tends to establish the upper level of the alternating signal appearing at point H. In other words, whenever the plate voltage of tube 59 rises to a high enough level so that the voltage coupled to point H through capacitor 60 rises above the voltage at the tap of potentiometer 62, the diode 61 becomes conductive and provides a very short time constant charging circuit for capacitor 60. Capacitor 60 then charges so that the point H does not substantially rise above the voltage level at the tap of potentiometer 62. However, any negative excursion of the plate voltage of tube 59 then produces a corresponding decrease in voltage at point H since the diode 61 immediately becomes non-conductive with the result that the alternating signal at the plate of tube 59 is effectively repeated at point H but now has a fixed D.C. level whose upper limit is substantially at the level of the voltage obtained at the tap on potentiometer 62.

Those portions of the alternating voltage at point H which are more negative than the grid voltage of tube 66 cause the diode 65 to conduct and negatively charge the capacitor 67. As is shown by comparing lines H and J, the negative variations of both the spurious signal at time 0 and also the vehicle reflections occuring at approximately time 20 appear at the grid of tube 66, but the lower amplitude of the secondary reflection appearing at time 30 does not appear there because of its appreciably lower amplitude. The time constant of this capacitor 67 in cooperation with resistor 68 is such that it tends to filter out the 20 kc. frequency with the result that substantially only the envelope of the voltage at point H appears on the control grid of tube 66. This is readily seen by referring to and comparing lines H and J of FIG. 4.

It will be observed that even at the control grid of tube 66 the spurious signal is of substantially greater amplitude than that of the desired reflection signal. To overcome this, the plate of the tube 66 is provided with its voltage directly from the plate of tube 31 in the free running multivibrator 15. As shown at line A of FIG. 4, this voltage goes quickly negative at time 0 and remains at a low level for approximately 10 milliseconds or throughout the time that the spurious response is present. Thus, by gating the plate of tube 66 with this voltage, it is apparent that practically no output voltage is obtained throughout this time. The voltage does rise to some extent in accordance with the low plate voltage that is present during this interval from the multivibrator and in accordance with the negative excursion of the grid voltage, but when the grid voltage pulse has decayed, the plate voltage abruptly returns to a low level as the tube becomes again fully conductive to the extent then permitted by the very low plate voltage. However, at the time of the desired reflection pulse, the plate voltage of tube 66 is at the normal high level and the negative-going grid voltage is then effective to produce a substantial positive going pulse at the plate. This positive going pulse is applied through the coupling diode 69 to the control grid of tube 70.

Capacitor 71 is connected from the grid of tube 70 to ground and is by-passed by the resistor 72. Each positive-going pulse adds a positive charge to capacitor 71 and causes the grid of tube 70 to rise in potential accordingly. Since the cathode of this tube is connected to a voltage above ground as determined by the position of the tap on potentiometer 73, the grid must rise to some predetermined positive voltages in excess of its normal level before the tube can conduct and pick up the relay 26 in its plate circuit. As long as the successive pulses from the plate of tube 66 occur with sufficient rapidity as related to the discharging time constant of capacitor 71, the voltage at the grid of tube 70 will become increasingly positive, so that tube 70 will eventually conduct sufficiently to pick up relay 26. However, if these pulses do not occur for some time, or occur only infrequently, the capacitor 71 will then gradually lose its positive charge through resistor 72 and the tube will then again cut off so as to release relay 26.

It will be apparent that the time constant for the discharging of capacitor 71 can be so selected that this capacitor will discharge sufficiently between successive vehicles to permit relay 26 to drop away. In this way a vehicle count is obtained since the relay 26 of the traffic detection apparatus will operate once for each vehicle. On the other hand, if the time constant for the discharge of capacitor 71 is selected to be longer, successive vehicles will produce sufficient positive pulses at the grid of tube 70 to maintain a positive grid voltage across capacitor 71 and thus maintain the relay 26 picked up provided that the spacing between any two successive vehicles is not so great as to permit capacitor 71 to become substantially discharged. Under these circumstances, the relay 26 will act as a detector of traffic in that it will remain picked up only when vehicles pass by with a frequency above some particular lower limit, whereas the relay will drop away if vehicles do not occur with such frequency.

A simple modification of the embodiment just described is illustrated in FIGS. 5, 6A and 6B. This modification is achieved merely by varying the components of asymmetrical multivibrator 15 and changing the wiring to the contacts of relay 26.

For purposes of this proposed modification, the components of asymmetrical multivibrator 15 are so chosen that each complete multivibrator cycle is slightly longer than the transit time required for each transmitted pulse to be reflected from fixed surface 11 and received by transducer 10. Assuming that transducer 10 is mounted in the position as assumed above and shown in FIG. 1A, the new multivibrator cycle should be approximtaely 50 milliseconds in duration as shown in line A of FIGS. 6A and 6B.

Also, as can be seen in line A of FIGS. 6A and 6B, the time constants in modified multivibrator 15 are chosen so that tube 31 remains conductive during most of the cycle.

As the result of these changes in multivibrator 15, gated amplifiers 20 and 24 are gated "off" during the major portion of the period following each transmitted pulse. Thus, all pulses reflected from passing objects, or more specifically, from passing vehicles as shown in FIG. 1A, are received by transducer 10 at a time when the detection circuits are non-responsive. That is, regardless of the size of a passing object or its relative distance from fixed surface 11, pulses reflected from its surface are not detected.

On the other hand, gated amplifiers 20 and 24 are gated "on" during the time when pulses reflected from fixed surface 11 are normally received by transducer 10. This results in the production of large positive pulses at point K as explained above, these pulses occurring in this modified form as shown in FIG. 6A. A continuous train of positive pulses at point K maintains conduction through tube 70 and holds relay 26 in its picked up position.

Therefore, it can be seen that, with the modifications just explained, relay 26 is normally picked up, and it is dropped away only when a passing object cuts off the normally present train of pulses reflected from fixed surface 11. (See waveforms in FIG. 6B.) By utilizing a back contact of relay 26 in a control circuit, it should be obvious that traffic controls, counters, etc., can be operated as explained above in accordance with the passage of objects between transducer 10 and fixed surface 11.

Having described two forms of vehicle detection means as specific embodiments of this invention, we desire it to be understood that various modifications, adaptations, and alterations may be made to the specific form shown without departing from the spirit or scope of the invention.

What we claim is:

1. In a system for detecting the presence of an object, transmitting means for directing a beam of regularly occurring sound pulses toward said object and impinging only in the absence of said object upon a fixed sound reflecting surface which is more distant than said object receiving means located to receive said sound pulses after their reflection from said object when it is present or from said fixed surface in the absence of any object, the repetition rate of said pulses being selected to cause the interval between successive pulses to equal substantially the transit time of a pulse from said transmitting means to said fixed surface and thence back to said receiving means, time gating means nonresponsive to said receiving means only during a time interval overlapping the time of transmission of each pulse but not the expected time of reception of reflection pulses from said object when said sound pulses impinge thereon, whereby any reflected sound pulses received by said receiving means in the interval between successive transmitted pulses and at a time when said receiving means is not rendered responsive by said gating means producing an output from said gating means, and output means governed by the output of said time gating means for indicating the presence of one of said objects.

2. In combination, in a system for the detection of a vehicle passing in front of a fixed sound reflecting surface, means for transmitting a beam of repetitive sound pulses toward said surface so as to be intercepted by said vehicle, means receiving the sound pulses reflected alternatively from said fixed surface and said vehicle, the period of said repetitive pulses being caused to equal substantially the propagation time of a sound pulse from said transmitting means to said fixed surface and back to said receiving means, selectively responsive means governed by said transmitting means and being nonresponsive to said receiving means only throughout a time period encompassing the time of transmission of each of said pulses but not including the expected reception time by said second-named means of said sound pulses reflected from said vehicles, and means governed by said responsive means to give a distinctive indication of the presence of a vehicle.

3. In combination, in a vehicle detection system, transmitting means for transmitting pulses of sound energy repetitively at a selected rate and directed toward said vehicles to be detected, said vehicles passing within a known range of distance from said first-named means, receiving means for receiving said sound energy upon its being reflected from said vehicles, detector means governed by said receiving means and being distinctively responsive to said reflected sound energy for giving a distinctive indication as to the presence of said vehicles, circuit means for eliminating the effects on said detector means of reflections by said receiving means from a fixed surface beyond said known range of distance when a vehicle is not present, said circuit means comprising gating circuit means controlled by said transmitting means for rendering said receiving means nonresponsive to reflected sound pulses received during a selected time period encompassing the time of transmission of each pulse of energy by said transmission means, said repetition rate being selected to cause each pulse to be transmitted substantially at the same time that said receiving means receives a reflection of the last-transmitted pulse from said fixed surface, whereby said gating circuit means also renders said receiving means nonresponsive at the time of reception by said receiving means of said reflections from said fixed surface.

4. A system for detecting the presence of vehicles comprising, means for transmitting a beam of successive sound pulses toward said vehicles and impinging when no vehicle is present upon a fixed sound reflecting surface more distant from said transmitting means than said vehicles selectively responsive, receiving means including transducer means so positioned and directed as to receive reflections of said sound pulses from said surface, gating circuit means demarcating a time interval subsequent to the transmission of each sound pulse by said transmitting means and encompassing the expected time of reception by said receiving means of the reflection of said transmitted pulse from said surface but not encompassing the expected time of reception of reflections of said transmitted pulse from a vehicle, said gating circuit means controlling said receiving means to provide an output signal in response to received reflection pulses occurring only during said limited time interval, said transmitting means transmitting said successive pulses with a period at least equalling the round trip propagation time of a pulse from said transmitting means to said fixed reflection surface and back to said receiving means, and output circuit means being distinctively controlled by the output of said receiving means for providing an indication of the presence of a vehicle within said sound beam.

5. In a system for detecting the presence of vehicles, the combination comprising, transmitting means for directing a beam of repetitive sound pulses across the path of said vehicles and impinging in the absence of any vehicle upon a fixed sound reflecting surface more distinct from said transmitting means than said vehicles when they intercept said beam, selectively responsive receiving means including sound transducing means positioned and directed to receive reflections of said transmitted sound pulses from said surface, said transmitting means generating successive of said sound pulses with a period greater than the propagation time of each sound pulse between its transmission and subsequent reception by said receiving means when reflected from said surface, gating circuit means for controlling said receiving means to provide an output only for input reflection pulses occurring during a limited time interval following the transmission of each pulse throughout which interval reflection pulses from said surface are expected at said transducing means, said limited time interval not including the time during which reflection pulses from said vehicle are expected at said receiving means, and output circuit means being distinctively controlled by the output of said receiving means for providing an indication of the presence of a vehicle within said sound beam.

6. The system as defined in claim 5 wherein said transmitting means directs said beam of sound pulses downwardly upon the tops of passing vehicles so that they impinge upon the roadway along which said vehicles travel when no vehicle is present and said transducing means associated with said receiving means is located over the top of said roadway and directed downwardly to receive reflections from the surface of said roadway.

7. The system as defined in claim 5 wherein said gating circuit means is set into operation by said transmitting means each time a sound pulse is transmitted.

8. In a system for detecting the presence of a vehicle in a detection zone defined by at least one beam of repetitive sound pulses impinging in the absence of any vehicle upon at least one sound reflecting background surface but impinging instead upon a vehicle when it passes in front of said background surface the combination comprising, receiving means including a receiving transducer being positioned and directed to be responsive to reflections of said pulses both from said vehicle and alternatively from said background surface, each sound pulse when reflected from said vehicle being received within a predetermined first interval occurring subsequent to the time of transmission of said pulse but being received instead within a different second time interval subsequent to said first interval when said pulse is reflected from said background surface, gating circuit means demarcating in the time between each pair of successive sound pulses, a fixed time period substantially coextensive with one of said intervals but not the other and controlling said receiving means to supply a distinctive output only for each sound pulse received by said receiving transducer during said demarcated fixed time period, and vehicle registering means controlled by said receiving means for registering the presence of a vehicle.

9. The system as defined in claim 8 wherein the interval demarcated by said gating circuit means is said first time interval so that said receiving means provides said distinctive output only for each sound pulse reflected from a vehicle in said detection zone and said vehicle registering means is controlled to register the presence of said vehicle only when said distinctive outputs are provided by said receiving means.

10. The system according to claim 8 wherein the interval demarcated by said gating circuit means is said second time interval so that said receiving means provides said distinctive outputs only for each sound pulse reflected from said background surface, said vehicle registering means being controlled to register the presence of said vehicle only when said distinctive outputs are not provided by said receiving means.

11. In a system for detecting the presence of an object in a detection zone defined by a beam of repetitive energy pulses impinging only in the absence of said object upon an energy reflecting surface but impinging instead upon said object when it is within said detection zone the combination comprising, transmitting means including a transducer positioned and directed to transmit said pulses toward said object and said fixed reflecting surface, receiving means including a transducer being positioned and directed to receive reflections of said pulses from said object and alternatively from said fixed reflecting surface, said transmitting means being governed to transmit said repetitive pulses with a period which substantially equals the round-trip propagation time of a pulse from said transmitting transducer to said fixed reflecting surface and back to said receiving transducer, means for controlling said receiving means to be non-responsive to received pulses for a time interval encompassing the time of transmission of each pulse but not encompassing the expected reception time by said receiving means of reflections of the last-transmitted pulse from said object when in said detection zone, and means controlled by the output of said receiving means for providing a distinctive indication of the presence of said object inside the detection zone, whereby said output means is not improperly affected by energy coupled directly from said transmitting transducer to said receiving transducer at the time of transmission of each pulse nor by reflections of pulses obtained from said fixed reflecting surface.

12. In a system for detecting the presence of an object in a detection zone defined by a beam of repetitive sound pulses which impinge upon said vehicle only when it is within said beam the combination comprising, transmitting means including a transducer positioned and directed to transmit said sound pulse toward said vehicle, receiving means including a transducer positioned and directed to receive reflections of said sound pulses, means including a free-running asymmetrically operating binary device for controlling said transmitting means, said binary device upon each operation to a first of its conditions controlling said transmitting means to transmit a sound pulse, said binary device while in its said first state controlling said receiving means to be non-responsive to sound energy impinging upon said transducer associated with said receiving means, manual adjusting means for varying the length of time said binary device remains in its second state during each cycle of its operation, said binary device while in its second state controlling said receiving means to be responsive to energy impinging on said receiving transducer, and means controlled by said receiving means to indicate the presence of an object in said detection zone, whereby the repetition rate of said pulses may be varied without varying the length of time throughout which said receiving means is non-responsive.

13. Apparatus for detecting and counting objects passing through a detection zone defined by a beam of energy pulses which are directed across the path of said objects and impinge in the absence of any object upon an energy-reflecting surface comprising in combination, transmitting means for transmitting said energy pulses in a confined beam of sufficiently small cross section that said beam is fully blocked by each object passing through said detection zone, receiving means including a receiving transducer positioned to receive reflections of said energy pulses from said energy reflecting surface, means responsive only to the output of said receiving transducer produced by reflections of said energy pulses from said energy reflecting surface but not to the reflections of said energy pulses from said objects for indicating the presence of an object in said detection zone, whereby said object when in said detection zone shields said energy-reflecting surface from said beam of energy pulses and cuts off the output from said responsive means to thereby register the presence of said object.

14. Apparatus for registering the presence of a vehicle as it passes through a detection zone defined by a confined beam of discrete energy pulses which can impinge upon a fixed energy reflecting surface only when said vehicle is not within said detection zone and blocking said beam comprising, transmitting means for transmitting said energy pulses, receiving means for receiving reflections of said pulses from said fixed reflecting surface, said transmitting means transmitting said pulses with a period at least equalling the round-trip propagation time of a pulse from said transmitting means to said fixed reflecting surface and back to said receiving means, gating means demarcating a limited time interval following each transmitted pulse which encompasses the expected time of reception of said reflection pulses from said fixed reflecting surface but not the expected reception time of reflection pulses from said vehicle and being responsive to the output of said receiving means only throughout said limited time interval, and means governed by said gating means for registering the presence of a vehicle in said detection zone only when said gating means has not been responsive to reflection pulses from said fixed reflecting surface for a time in excess of the period of said energy pulses.

15. In a system for registering the presence of an object as it passes through a detection zone defined by a beam of energy which is directed toward and impinges upon said object when it is within said zone, transmitting means for directing said beam of energy toward said object, fixed means upon which said transmitted energy can impinge only when said object is not within said detection zone, receiving means including a transducer positioned on the same side of said fixed means as said transmitting means, said fixed means directing energy toward said transducer only when it receives energy from said transmitting means, said receiving means ordinarily receiving energy from said fixed means when no object is in said detection zone so that said fixed means has said beam impinging thereon but not receiving energy from said fixed means when said object is in said detection zone to thereby block said transmitted beam, signal generating means connected to said receiving means and producing a distinctive signal only when said receiving means receives reflected energy from said fixed means, and registering means responsive to said signal generating means for registering the presence of said object within said detection zone only when said signal generating means fails to produce said distinctive signal.

16. The object registering system of claim 15 in which the transmitted energy is in the form of repetitive discrete pulses of sound energy, said signal generating means is normally non-responsive, and timing means connected to said signal generating means enables said signal generating means to respond to energy impinging upon said receiving means only throughout a timed interval encompassing the expected reception of a sound pulse from said fixed means, said registering means being adjusted to its registering condition only when said signal generating means is non-responsive for a length of time in excess of the period of said transmitted pulses.

References Cited in the file of this patent

UNITED STATES PATENTS

| | | |
|---|---|---|
| 2,594,276 | Barker | Apr. 29, 1952 |
| 2,622,140 | Muller | Dec. 16, 1952 |
| 2,740,112 | Goldberg | Mar. 27, 1956 |
| 2,814,725 | Jacobs | Nov. 26, 1957 |
| 2,815,504 | Clark | Dec. 3, 1957 |
| 2,837,644 | Shallon | June 3, 1958 |
| 2,844,763 | Wycoff | July 22, 1958 |

UNITED STATES PATENT OFFICE
CERTIFICATE OF CORRECTION

Patent No. 3,042,899                        July 3, 1962

Hugh C. Kendall et al

It is hereby certified that error appears in the above numbered patent requiring correction and that the said Letters Patent should read as corrected below.

Column 11, line 35, after "object" insert a comma.

Signed and sealed this 5th day of March 1963.

(SEAL)
Attest:

ESTON G. JOHNSON
Attesting Officer

DAVID L. LADD
Commissioner of Patents